US005813348A

United States Patent [19]

Zingher

[11] Patent Number: 5,813,348

[45] Date of Patent: Sep. 29, 1998

[54] PRINT JOB ALLOCATION SYSTEM

[75] Inventor: Oded Zingher, Alzenau, Germany

[73] Assignee: Man Roland Druckmaschinen, Offenbach am Main, Germany

[21] Appl. No.: 664,424

[22] Filed: Jun. 17, 1996

[30] Foreign Application Priority Data

Jun. 17, 1995 [DE] Germany ........................ 195 22 053.6

[51] Int. Cl.[6] ...................................................... G06F 15/00

[52] U.S. Cl. ........................... 101/494; 400/719; 395/114

[58] Field of Search .............................. 395/114; 400/61, 400/76, 719; 101/494

[56] References Cited

U.S. PATENT DOCUMENTS

| | | | |
|---|---|---|---|
| 5,091,859 | 2/1992 | Zingher et al. | 364/471 |
| 5,287,194 | 2/1994 | Lobiondo | 395/114 |
| 5,467,434 | 11/1995 | Hower, Jr. et al. | 395/114 |
| 5,467,436 | 11/1995 | Rodi et al. | 395/114 |
| 5,580,177 | 12/1996 | Gase et al. | 400/61 |
| 5,602,970 | 2/1997 | Janser | 395/114 |

FOREIGN PATENT DOCUMENTS

| | | | |
|---|---|---|---|
| 43 29 886 A1 | 3/1995 | Germany | 395/114 |
| 1-145718 | 7/1989 | Japan | 400/61 |

OTHER PUBLICATIONS

"Auch Reproabteilungen von Grossdruckereien stehen mit Reprofirmen im Wettbewerb," Deutscher Drucker, No. 21–22/Aug. 6, 1995, pp. 26–29.

"Formel aus Heidelberg: CPC 1 +CPC 2–S +CPC 3 + CPC 4 = CPData", Der Druckspiegel, Feb. 1993; pp. 129–130; including English Translation.

"Von der Maschinensteurung zur Datenzentrale", Der Polygraph, Jun. 1993; pp. 23–24, including English Translation.

"Die vernetzte Offsetdruckerei: Neue Formen der Integration samtlicher Fertigungsstufen in Prozessmanagementsysteme", Druckerei–Management; including English Translation.

"Serviceinformationen im Notebook", Polygraph, Feb. 1996, pp. 36, 50, 51; including English translation.

"Lokale Netz"; Datenverabeitung; Feb. 1986; pp. 57–60; including English translation.

Heidelberg Data Control Brochure, "Data Control—An Open System for Production", pp. 1–20.

*Primary Examiner*—Ren Yan
*Assistant Examiner*—Steven S. Kelley
*Attorney, Agent, or Firm*—Graham & James LLP

[57] ABSTRACT

A print job allocation system interlinks customers of a plurality of printing plants located throughout the world and a plurality of printing plants located throughout the world. The system includes a network for connecting the printing plant customers and a plurality of printing machine control devices controlling a plurality of printing machines in the plurality of printing plants. The system also includes a print job processor which receives print job data from the printing customers and printing machine data from the printing machine control devices. The print job processor processes the data received and allocates print jobs by matching desired print job requirements to available printing machine capacity and capabilities. Using various print job criteria, the print job processor selects one or more printing machines from one or more printing plants which provide for optimum use of the world-wide printing machines and optimum performance of the printing and distribution of the printed products.

13 Claims, 3 Drawing Sheets

PRINT JOB ALLOCATION SYSTEM

BACKGROUND OF THE INVENTION

I. Field of the Invention

This invention relates to an information transmission system for interconnecting world-wide printing plants and printing plant customers for allowing printing plant customers to input to the system printing job requests and for processing the printing job requests to determine which printing machine or machines in which of the world-wide printing plants should be used to perform the requested printing job in an optimum manner.

II. Description of Related Art

There is an increasing trend towards interlinking computers used in individual processing stations of a printing plant having a plurality of offset printing machines. A system is known wherein data necessary for controlling a respective one of the plurality of printing machines of a single printing plant for one print job is transmitted from a central control device, to which the plurality of printing machines in the single printing plant are connected, to a control device assigned to the respective printing machine performing the print job.

By using such a network within a printing plant, it is possible to process data for print jobs which are to be carried out in the future and to optimize the job utilization of a plurality of printing machines contained in the single printing plant.

DE 4 329 886 A1 describes such a control system for a printing plant in which production processes currently being executed and production processes to be executed in the future can be monitored and planned.

A data management system of this type interconnecting a plurality of printing machines provided within a single printing plant has great potential in terms of efficiency of use of the printing machines in a single printing plant. However, the efficiency is limited at present by the fact that materialization of a print job, that is, the allocation of a print job request and data from the customer to the printing plant and also the distribution of the printed products, is designed in a conventional manner. Thus, it often occurs that a printing plant carries out printing jobs in a manner that achieves efficiency from the point of view of completing a printing job while making the most efficient use of the printing machines and the machine usable time of the printing machines in a single printing plant. However, such a system does not provide an optimum print job allocation method because of the limited nature of available printing machines in a single printing plant. That is, there may be printing machines located outside of a particular printing plant that would provide for more optimum handling and completion of a given printing job.

For example, a printing plant which has the most modern technology for performing pre-preparation, print production and post-printing processing, should never accept a print job that is to be carried out at a lower quality. Instead, the printing plant which has the most modern technology should only accept a print job requiring the highest quality to save time and make the most efficient use of the available technology.

In addition, the route following the production of a printed product, i.e. the further processing of the finished printed product, is also designed in a very conventional way. Thus, printed products are often prepared at a central location, the most efficiently arranged supplier, and then transported to the various post-printing processing destinations. This increases the printing costs because of the increased transport and distribution steps.

In determining a price for a print job, in addition to the material costs, quality requirements and delivery deadlines also play important roles, as do the previously mentioned transport and distribution costs. In the above-described conventional method of allocating print jobs, receiving printing job requests is thus limited to requests entered at a single printing plant and print jobs to be performed at the single printing plant. In addition, the possibility of making comparisons of available printing machines and printing job requirements is also limited to only those machines contained within the single printing plant.

The German publication "Deutscher Drucker," No. 21-22/8.6.95, p. w26 ff, discloses a network connecting a single printing plant and customers of the printing plant. The network is used for the purpose of transmitting image or printing data to and from the customers to the single printing plant.

BRIEF DESCRIPTION OF THE PRESENT INVENTION

The preferred embodiments of the present invention overcome the disadvantages of the prior art discussed above by providing a print job allocation system in which printing plant customers and printing plants located throughout the world are connected to each other via a network that receives print job requests and dispatches the print job requests to one or more of the connected printing plants.

The print job allocation system according to the preferred embodiments of the present invention allocates print job requests received from world-wide printing customers in a manner such that the costs, transport distances and transport times involved in the production of printed products are minimized and the utilization of a plurality printing plants located throughout the world is optimized.

The preferred embodiments of the present invention provide a method and system for connecting world-wide printing plants and printing plant customers for allowing printing plant customers to enter into the system printing job requests and related data and for processing printing job requests to determine which of the world-wide printing plants should be used to perform the requested printing job in the most efficient manner.

According to a specific preferred embodiment of the present invention, a print job allocation system includes a plurality of printing plant customers connected to a network via a data input device used for entering image data and other print job data for a particular print job being requested. The data entered into the data input device is transmitted via the network to a print job processor. The print job processor is preferably accessible and capable of being connected to the world-wide printing plant customers and the world-wide printing plants. The print job processor processes the input print job data and determines which of a plurality of printing machines should execute the requested print job. The determination of a printing machine or printing plant is made by the processor based on several criteria described in more detail below. Once the print job processor selects a printing device or devices of a particular printing plant or plants, the print job data is transmitted either directly from the data input device or via the network to at least one printing machine control device connected to the selected printing machine(s). Then, the requested print job is performed by the selected printing machine(s) and the printed products are distributed as desired.

Other features and advantages of the present invention will become apparent from the following description of the preferred embodiments of the invention which are shown in the accompanying drawings.

DETAILED DESCRIPTION OF PREFERRED EMBODIMENTS

Figure 1:
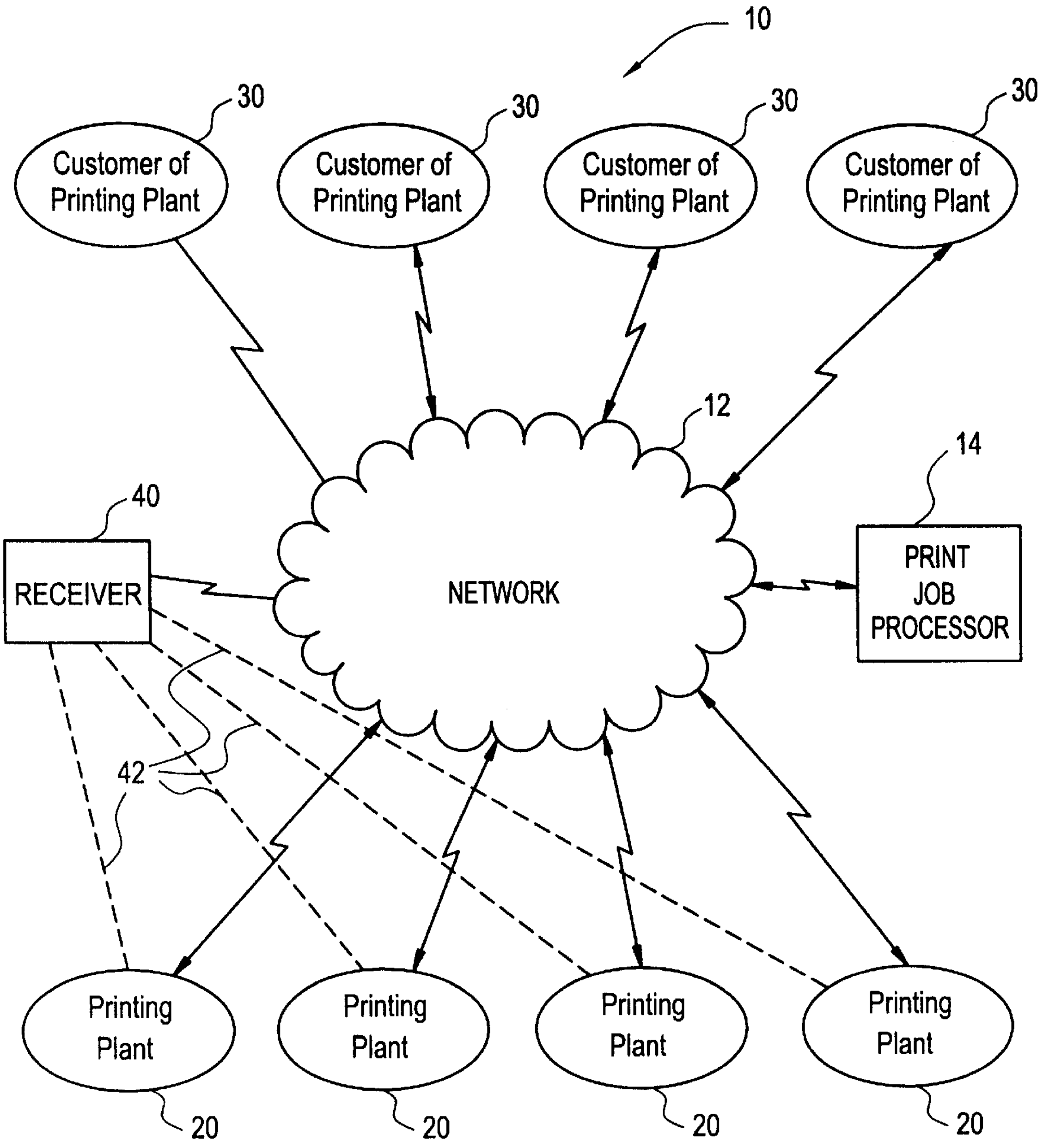
FIG. 1 is a schematic view of a print job allocation system according to a preferred embodiment of the present invention.

According to the preferred embodiments of the present invention, a print job allocation system 10 for interconnecting world-wide printing plants 20 and printing plant customers 30 is shown in FIG. 1. The system 10 includes a print job processor 14 preferably comprising one or more computers or other suitable data processing device(s) described in more detail below. A plurality of printing plants 20 located throughout the world and a plurality of customers 30 of the printing plants 20 also located throughout the world are capable of being connected to the print job processor 14 and directly to each other via a suitable data transmission network 12 such as a wireless network, ISDN network, telephone lines, fiber optic lines, the Internet, X400 networks used by Compuserve, America Online, NIFTY, and any other suitable data transmission network.

The data transmitted over the network 12 can be encrypted using known encryption devices and authentication codes, as desired, for security of data and to prevent tampering with print job requests or printing plant data. All of the data transmitted in the print job allocation system 10 may be encrypted for maximum security. Alternatively, various selected data transmissions in the print job allocation system 10 may be encrypted as desired. For example, it may be desirable to encrypt only data relating to print job requests and transmit the printing plant data in an unencrypted format.

The print job processor 14 preferably comprises one or more computers including a database, memory or other suitable data storage device (not shown) which can store data received from the printing plants 20 and printing plant customers 30. The information received from one or more of the printing plants 20 which is preferably used to define a printing plant profile(s) may include printing performance capabilities including levels of print quality available, printing processes used, number and identity of colors used in printing, and other suitable information about printing plant performance. The information received from the printing plants 20 also preferably includes information about present and future available printing machine capacity, scheduling information including the number of jobs in queue and estimated time of completion of jobs in queue and the personnel qualifications for each of the printing machines 22 in each of the printing plants 20. The information supplied by the printing plants 20 to the print job processor 14 can be updated continuously or periodically using a data polling method, an interrupt method or other suitable data request and transmission methods known to be performed by computers and appropriate software.

The information received from one or more of the printing plant customers 30 may include print job data for creating a print plate or an original for an image to be printed and print job related data such as pre-print processes to be performed, the type of material to be printed on and its specific use (advertising, magazine, newspaper), print job delivery deadline, the number of copies to be printed, the desired print quality, desired print job cost including material, pre-print processing, printing, post-print processing, transport and distribution costs and the destinations to which the printed copies are then to be distributed. This information should be understood to also include the type of substrate to be printed on, the number of colors and identity of colors and information used by the print job processor 14 for determining available format ranges, ink weights and other information necessary for processing a requested print job. Furthermore, the information may also include information concerning the various methods used for further processing to be performed by the respective printing plants 20, such as folding, cutting, printing of marks to be detected by optical sensors for performing folding and cutting operations and any additional pertinent information.

Figure 2:
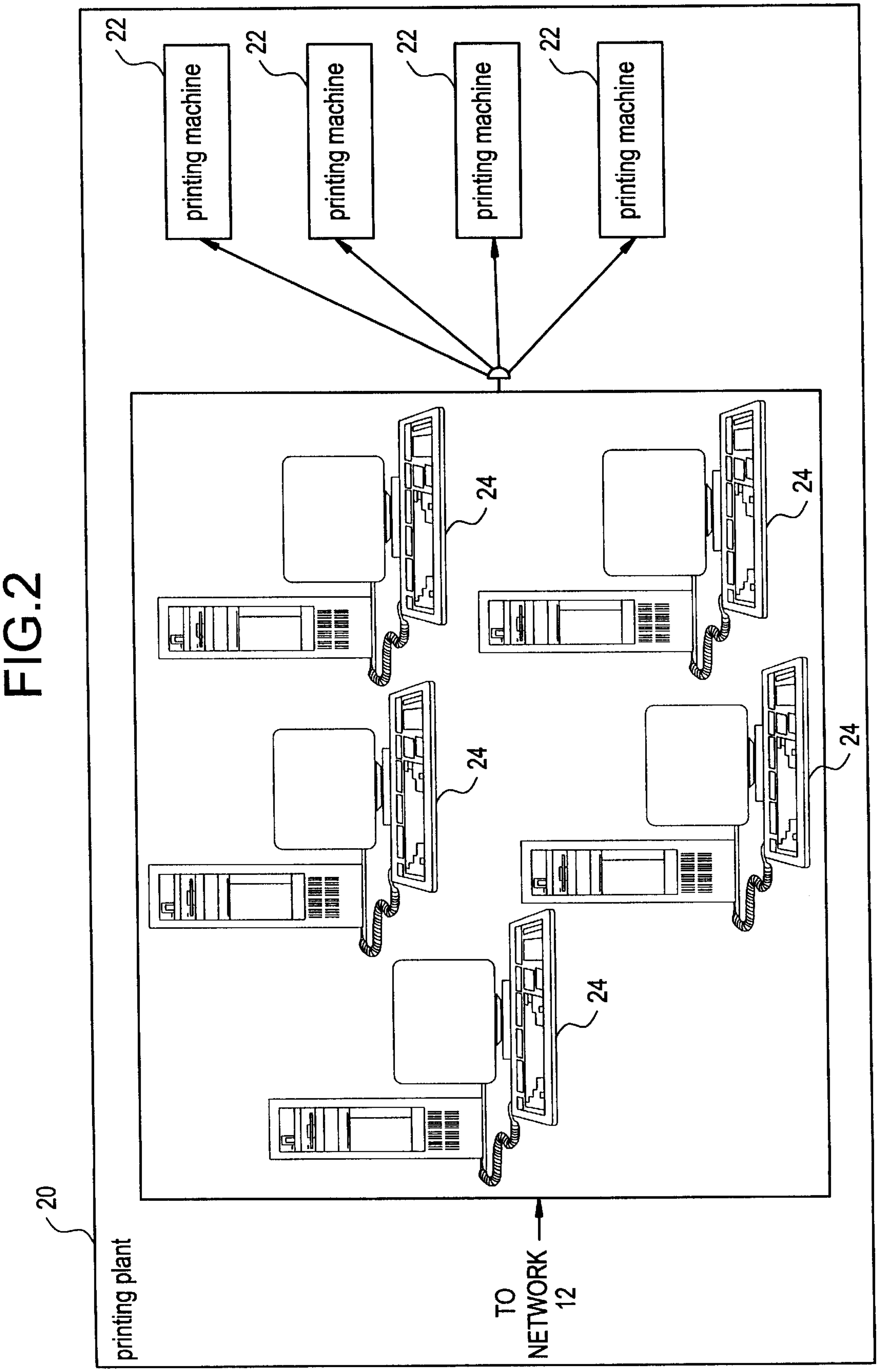
FIG. 2 is a schematic view of one of the printing plants connected to the network of the print job allocation system shown in FIG. 1.

As shown in FIG. 2, each of the printing plants 20 preferably includes a plurality of printing machines 22 each preferably including at least one printing machine control device 24 connected thereto possibly as a network in a client/server architecture preferably similar to that described in U.S. Pat. No. 5,091,859. Although it is shown in FIG. 2 that a printing machine control device 24 is provided for each printing machine 22, it is possible that a single printing machine control device 24 controls each of the printing machines 22 in a printing plant 20.

The printing machine control devices 24 in FIG. 2 each preferably comprises a known control computer or other suitable controlling device. The printing machine control devices 24 are each preferably connected to the print job processor 14 via the network 12. The printing machine control devices 24 may also be connected directly to the print job processor 14. As is known, the printing machine control devices 24 receive and store the information about past, current and future printing machine operation, present status of a respective printing machine, the performance capabilities of the respective printing machine and other data about the respective printing machine. These data about the printing machines 22 are transmitted from the printing machine control devices 24 via the network 12 to the print job processor 14. These data are used by the print job processor 14 for determining capacity and optimum use of the various printing machines in the printing plants connected to the network 12.

Figure 3:
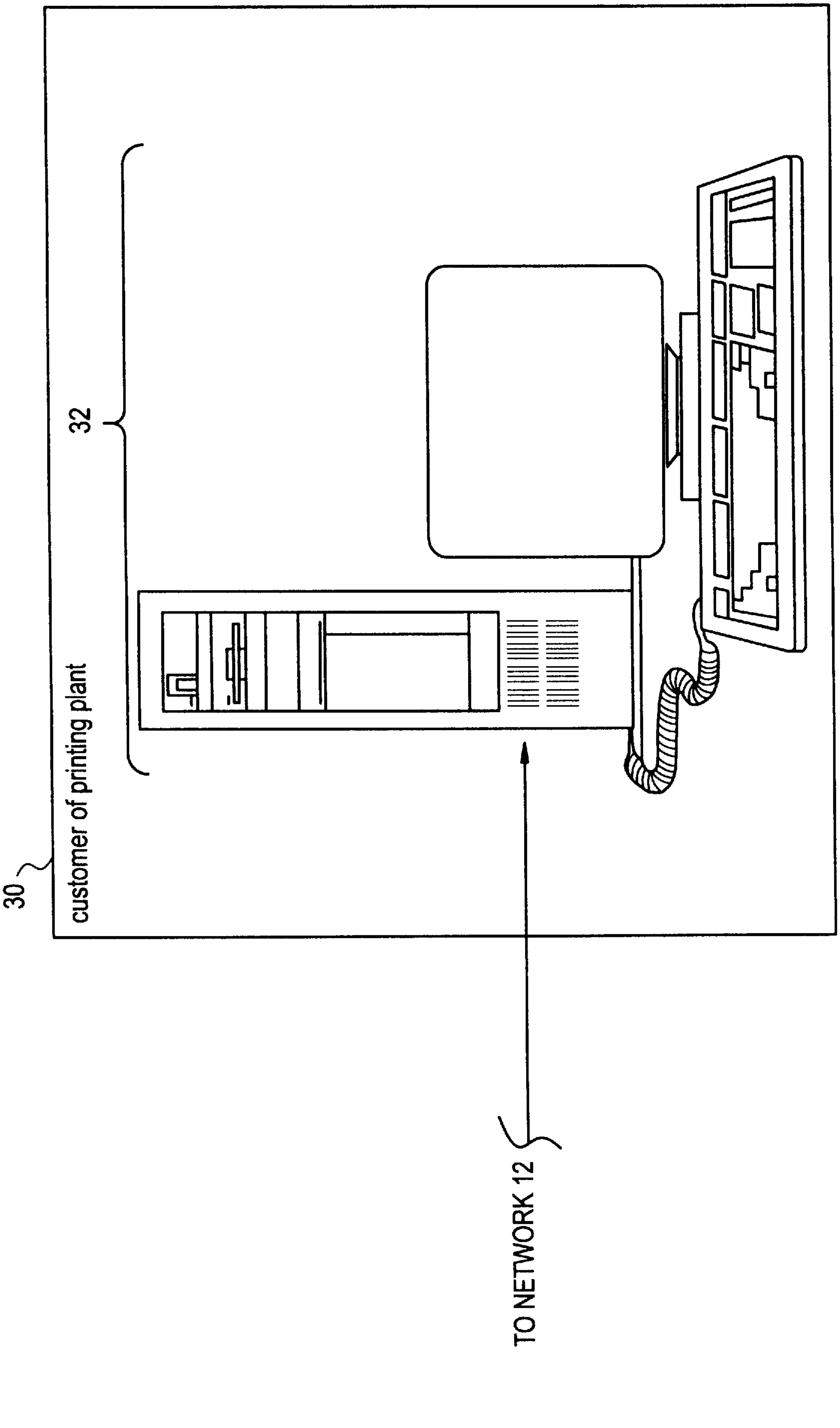
FIG. 3 is a schematic view of one of the data input devices allowing the printing customers to transmit data to the network and printing plants of the print job allocation system shown in FIG. 1.

FIG. 3 shows one of the printing customers 30 capable of being connected to the print job processor 14 via the network 12 and/or directly to the printing machine control devices 24. The printing customers 30 preferably use a data input device 32 such as a personal computer or one or more other suitable data input devices such as an optical scanner, a disk having stored data thereon, a keyboard, a mouse, a display screen, a bar code reader, a voice synthesizer and any other suitable data input device.

In a preferred embodiment, the data input device 32 preferably includes known print job data input software and appropriate known graphics software used by printing plant customers 30 to create an original for an image to be printed. Furthermore, this software allows the customers 30 to input additional parameters which define the print job, such as the print job information described above including the type of printed material, the number of copies to be printed, the print quality and the destinations to which the printed copies are then to be distributed, all of which may be entered using the data input device 32. The data entered by a customer 30 to the data input device 32 are transmitted via the network 12 to the print job processor 14. The data may also be transmitted directly to the printing machine control devices 24 after the print job processor 14 has selected a printing machine(s) 22 to process a requested print job, as explained in more detail below.

According to a preferred embodiment of the present invention, the data input devices 32 may include tools and objects for allowing the customers 30 to create an original for an image to be printed, including text, graphics and other information.

The print job processor 14 preferably includes a database in which both previously created image and text elements or pointers to other networks having previously created images and text are stored as object types. This avoids the printing plant customers 30 having to repeatedly create the same text or image elements. The image and text elements stored in the print job processor 14 or stored in other networks and identified by pointers stored in the print job processor 14 can be incorporated with one another using a known image and text processing device. These stored object types of previously created image and text elements can be identified using the data input devices 32 by the printing plant customers 30 while inputting print job data. The identification data is included in the print job data transmitted from the data input devices 32 to the print job processor 14 such that the print job processor 14 retrieves the desired stored image and text elements and incorporates these elements into the print job data used for creating an original of the image to be printed.

In addition, a further software program can preferably be provided in the database of the print job processor 14 for determining which quality criteria are most important after the print original has been created. The requirement features or profile necessary for reproducing the quality of the future printed product can thus be derived automatically by the print job processor 14.

As discussed above, the above-described data from the printing machine control devices 24 are received via the network 12 at the print job processor 14. The data received from the printing machine control devices 24 are preferably stored in the database or memory of the print job processor 14.

When the data from the data input devices 32 are received at the print job processor 14, the data are preferably compiled into a requirements profile for a particular print job which may be temporarily stored in the database of the print job processor 14. The requirements profile preferably comprises a grid of information for a particular print job.

Using a printing plants profile generated from the data received from the printing machines 22 via the printing machine control devices 24 and the print job requirements profile generated from the data received from the data input devices 32, the print job processor 14 determines which printing machine(s) 22 in which printing plant(s) 20 are capable and available for processing a print job of the type input by the printing plant customer 30. Here, it is particularly important that the distribution requirements of the printed product, included in the requirements profile, are simultaneously taken into account when determining the optimum use of the printing machines 22 located throughout the world. Thus, as early as during the allocation of the print job for later dispatching of the print job, the distribution requirements of a print job are considered.

In the print job processor 14, the job requests entered by the customers 30 via the network 12 are compared against the free or available capacity input to the print job processor 14 via the printing machine control devices 24 of each of the printing plants 20. A particular print job is allocated and distributed to one or more printing plants 20 in accordance with the requirements profile generated from the data input by the customers 30 via the data input devices 32. As a result, each print job can be carried out in the best possible manner with regard to the optimization of time, material costs, desired quality and any other suitable criteria.

The requirements profile generated from the data input by the customers 30 of the printing plants in accordance with the image to be produced and the printing plants profile generated from the data input from the printing plants 20 are used by the print job processor 14 to match a requested print job to one or more printing machine(s) 22 in the printing plants 20 based on several criteria including cost, quality requirements, delivery deadlines, transport and distribution requirements and any other suitable criteria. The print job processor 14 preferably uses a Sequence Query Language database such as ORACLE, IBM DB2, Gupta SQL databases and other suitable databases for performing the matching of the print job request with one or more printing machines 22. Alternatively, the print job processor 14 can use a print job/printing machine selection software program either developed specifically for the system of the present invention or a known program such as the one used in the device described in U.S. Pat. No. 5,091,859.

Preferably, a printed product which is to be distributed to several locations, for example, a printed advertisement to be distributed to several different geographic regions, is created in printing plants 20 which are as close as possible to the locations in which the distribution has to take place. As a result of the reduction in the transport costs, there is also less environmental loading especially if the receiver (end user) 40 uses a display screen or other output equipment to receive a printed product so that there is no material transport. For example, the receiver 40 might be a person that is to receive a print job such as an advertisement or magazine. The receiver 40 can receive a physical product such as a paper advertisement or magazine which is physically transported from the printing plants 20 to the receiver 40 using traditional transport methods, such as mail, courier, shipping vehicles, etc., shown in FIG. 1 by dotted lines 42 which are transport lines.

Alternatively, the receiver 40 may receive the print job input by the print job customers 30 (i.e., advertising office or magazine publisher) via a computer terminal and monitor or other suitable display device so that it is unnecessary to actually produce a printed product at the printing plants 20 and so as to avoid the time and costs associated with pre-print set-up, printing, post-print processing, distribution and transport. In this example, the print job request input by the customer of the printing plant 30 is transmitted directly to the receiver 40 via the network 12 without actually using a printing machine 22 to print the print job.

In the previously described print job requirements profile for a future printed product, quality data of the print job also plays an important role in the determination of which printing machine 22 should perform the printing. For example, for printed products which are configured in an extremely complicated way, only printing plants 20 having the most modern technology are considered for processing the print job. The data concerning desired quality are simultaneously taken into account, according to the preferred embodiments of the present invention, during the collecting of information used in determining which printing machine or machines 22 in which printing plant or plants 32 is to carry out the job.

Thus, the print job processor 14 using the suitable SQL database selects one or more printing machines 22 of one or more printing plants 20. The print job processor 14 can be programmed to directly dispatch the print job data and print job request to the printing control device 24 controlling the selected printing machine 22 to have the printing machine 22 process the print job.

Alternatively, to provide for a minimum of data transfer, the data input device 32 may be programmed to only transmit to the print job processor 14 via the network 12, print job scheduling information and only a minimum amount of print job data that is necessary for the print job processor 14 to select the optimum printing machine or machines 22 to process the requested print job. After selecting the optimum printing machine(s) 22, the print job processor 14 dispatches the selected printing machine identity and associated printing machine availability and capacity data to the data input device 32 of the printing plant customer 30 requesting the print job. The data input device 32 then transmits all of the necessary print job data or information concerning a location of a required, previously created image or text object directly to the printing machine control device 24 controlling the selected printing machine 22 to have the selected printing machine 22 process the print job.

In another modified embodiment, it is possible for the printing plant customer 30 to override or refuse to use the printing machine 22 selected by the print job processor 14. That is, the data input device 32 may be programmed to allow a printing plant customer 30 to review the selected printing machine identity and associated printing machine availability and capacity data received from the print job processor 14. If the printing customer 30 does not want to have the selected printing machine 22 perform the requested print job for various reasons such as cost, previous problems with a specific printing plant, etc., the printing customer 30 can request that the print job processor 14 select another printing machine(s) 22. In addition, the print job processor can be programmed to transmit a list of optimal printing machines 22 selected based on the criteria described above to allow the printing plant customer 30 to choose which printing machine 22 on the list received from the print job processor 14 should perform the requested print job.

The connection of the printing plant customers 30 to the printing machine control devices 24, either directly or via the network 12, also allows the printing plant customers 30 to monitor the print job performance and to determine the result of the print job once it has been completed.

Thus, the network 12, the printing machine control devices 24 and data input devices 32 allow a plurality of printing plant customers 30 and a plurality of printing machines 22 in a plurality of printing plants 20 located throughout the world to be interconnected. Consequently, the print job processor 14 can be interfaced by one or more printing plants 20 so that available printing machine capacity for scheduling future print jobs can be stored in the database of the print job processor 14. In addition, the customers 30 of the printing plants 20 can input information about future print jobs into the print job processor 14 via the data input devices 32.

As a result of the interlinked print job allocation system according to the preferred embodiments of the present invention, and in particular, on a world-wide scale between customers of printing plants and the printing plants, maximum efficiency and individualization is furthermore possible for the production of printed products. Thus, a printed product which is to be distributed in various countries and also contains text can be created to have text printed in the language of any country. It is also particularly preferable that a distribution of the print job and the image data occurs first, and only in a subsequent step is the creation of the print job carried out. The creation of a print job at a central location is thus avoided, as is the associated costly printed product distribution and transport steps of the prior art methods.

Although the present invention has been described in relation to particular preferred embodiments thereof, many other variations and modifications and other uses will become apparent to those skilled in the art. It is preferred, therefore, that the present invention be limited not by the specific disclosure herein, but only by the appended claims.

What is claimed is:

1. A print job allocation system comprising:

a plurality of data input devices for allowing a plurality of printing plant customers to input print job requests and print job data concerning a requested print job;

a plurality of printing plants for printing the requested print job, each of the plurality of printing plants including a plurality of printing machines contained therein; and a print job processor for receiving the print job requests and print job data from one of the plurality of printing plant customers and selecting one of the plurality of printing machines contained within one of the plurality of printing plants to perform the requested print job based on at least one of a cost required to complete the requested print job, quality requirements of a requested print job, delivery requirements of a requested print job and transportation and distribution requirements for a requested print job.

2. The system of claim 1, wherein the plurality of printing plants include a plurality of printing machine control devices connected to the printing machines for receiving printing machine data, each of the printing machine control devices including a printing machine data transmitter for transmitting printing machine data to the data transmission network.

3. The system of claim 2, further comprising a print job processor connected to the data transmission network for receiving the print job data and the printing machine data from the data transmission network and selecting at least one of the printing machines contained in at least one of the plurality of printing plants for printing the requested print job based on the print job data and the printing machine data.

4. The system of claim 3, wherein the print job processor comprises at least one computer including a selection device for selecting the at least one of the printing machines using the print job data, the printing plant data and selection criteria including at least one of material cost, printing cost, print job deadlines, printed product distribution requirements and post-printing processing steps related to the requested print job.

5. The system of claim 3, wherein the print job processor comprises at least one computer for receiving the print job data and the printing machine data and for compiling a print job requirements profile and a printing plants capabilities profile, the print job processor including a matching device for matching the print job requirements profile and the printing plants capabilities profile for selecting the at least one printing machine for printing the requested print job.

6. The system of claim 5, wherein the matching device comprises a sequence query language database.

7. The system of claim 1, wherein each of the data input devices comprises at least one computer including a print image original creation device for allowing one of the plurality of printing plant customers to create a print image original and a print job related data input device for allowing the plurality of printing plant customers to input print job related data related to the requested print job.

8. The system of claim 7, wherein each of the data input devices transmits only the print job related data to the print job processor via the data transmission network, the print job processor using only the print job related data to select the at least one of the printing machines of the printing plants for printing the requested print job and then transmitting a printing machine identification signal to one of the data input devices which input the print job data so that the one of the data input devices transmits the print job data and the print job related data to the at least one of the printing machines selected by the print job processor for printing the requested print job.

9. The system of claim 7, wherein each of the data input devices transmits the print job data and the print job related data via the data transmission network to the print job processor and the print job processor transmits the print job data and the print job related data to the at least one printing machine selected by the print job processor for printing the requested print job.

10. The system of claim 1, wherein each of the plurality of data input devices comprises at least one of a computer, a disk having data stored thereon, a display screen, a mouse, a bar code reader, an optical scanner and a voice recognition device.

11. The system of claim 1, further comprising a data transmission network connected to the plurality of data input devices and the plurality of printing plants, wherein the data transmission network comprises at least one of a wireless communications network, an ISDN network, a plurality of telephone lines, a plurality of fiber optic lines, and Internet network and an X400 network.

12. The system of claim 11, further comprising a receiving device for use by a receiver of the requested print job, the receiving device being connected to the data transmission network for receiving the requested print job directly from the data transmission network without the requested print job data being transmitted to and printed by any of the plurality of printing plants.

13. The system of claim 12, wherein the receiving device comprises at least one of a display device and a computer.

* * * * *